(12) United States Patent
Shima et al.

(10) Patent No.: US 6,452,748 B1
(45) Date of Patent: Sep. 17, 2002

(54) TAPE CARTRIDGE WITH MATCHED BRAKE LOCK AND BRAKE RELEASE PLATE

(75) Inventors: Motohiko Shima; Hiroshi Kaneda; Masatoshi Okamura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/562,341

(22) Filed: May 1, 2000

(30) Foreign Application Priority Data

May 21, 1999 (JP) .......................................... 11-141538
May 25, 1999 (JP) .......................................... 11-144615

(51) Int. Cl.⁷ .......................................... G11B 23/107
(52) U.S. Cl. .................................................... 360/132
(58) Field of Search .......................... 360/132; 242/343, 242/338.1; 188/218; 369/268; G11B 23/07

(56) References Cited

U.S. PATENT DOCUMENTS

| | | | |
|---|---|---|---|
| 3,934,839 A | | 1/1976 | Serizawa .................... 242/198 |
| 4,723,731 A | * | 2/1988 | Posso ....................... 242/338.1 |
| 4,896,238 A | * | 1/1990 | Oogi et al. .................. 360/132 |
| 5,027,249 A | * | 6/1991 | Johnson et al. ............. 360/132 |
| 5,366,173 A | | 11/1994 | Lammers et al. .......... 242/338.1 |
| 5,893,527 A | * | 4/1999 | Mizutani et al. .......... 242/338.1 |
| 5,901,916 A | | 5/1999 | McAllister et al. ......... 242/348 |
| 6,113,020 A | * | 9/2000 | Nayak ......................... 360/132 |
| 6,264,126 B1 | * | 7/2001 | Shima et al. ............... 242/343 |

FOREIGN PATENT DOCUMENTS

| | | |
|---|---|---|
| EP | 0 284 687 A2 | 10/1988 |
| EP | 0 926 676 A1 | 6/1999 |
| JP | 63-251983 | 10/1988 |
| JP | 0926676 A1 * | 6/1999 |
| JP | 411238352 * | 8/1999 |
| WO | WO 98/44506 | 10/1998 |

* cited by examiner

Primary Examiner—William Korzuch
Assistant Examiner—Christopher R. Beacham
(74) Attorney, Agent, or Firm—Drinker Biddle & Reath LLP (57) ABSTRACT

In a tape cartridge of the single-reel type having a hub on which a length of tape is wound, a brake mechanism contained in the hub is movable up and down to apply and release the brake on the tape reel. The brake mechanism and a brake lock release member disposed between it and the hub remain in sliding engagement after the release of the brake, and the resulting friction hampers smooth turning of the hub. Moreover, after the brake lock has been released, the center of the tape reel can be off the center of a rotating shaft of a recorder.

The hub of the tape reel has holes formed in its bottom wall for engagement with the brake release plate, the brake release plate is mounted in the hub with legs fitted in the holes of the latter, the brake lock rests on the brake release plate, the brake lock is formed with a dent (or lug) with a spherical end and the brake release plate is formed with a corresponding lug (or dent) with a spherical end on its upper surface. A highly slippery sheet member is interposed between the contacting parts of the brake lock and the brake release plate.

3 Claims, 11 Drawing Sheets

TAPE CARTRIDGE WITH MATCHED BRAKE LOCK AND BRAKE RELEASE PLATE

BACKGROUND OF THE INVENTION

1. Field of the Invention

This invention relates to a single-reel type tape cartridge for use with magnetic recording-reproducing apparatus (hereinafter called a "recorder").

2. Prior Art

Japanese Patent Application Kokai No. 63-251983 discloses a single-reel type tape cartridge having a brake lock which applies the brake on the tape reel and releases it by upward and downward motion within a hub on which the tape is wound.

Figure 5:
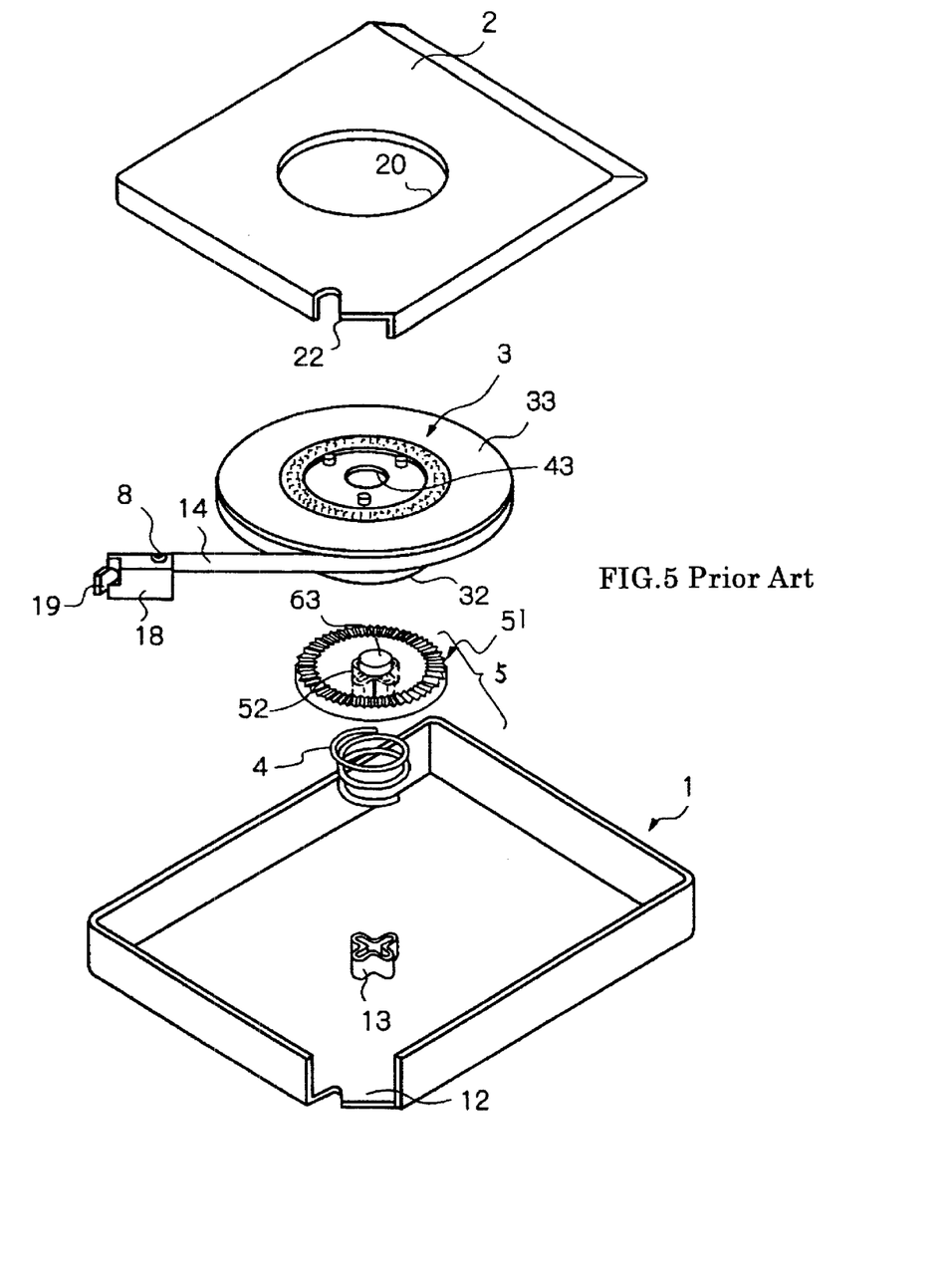
FIG. 5 is an exploded view of a conventional cartridge.
Figure 6:
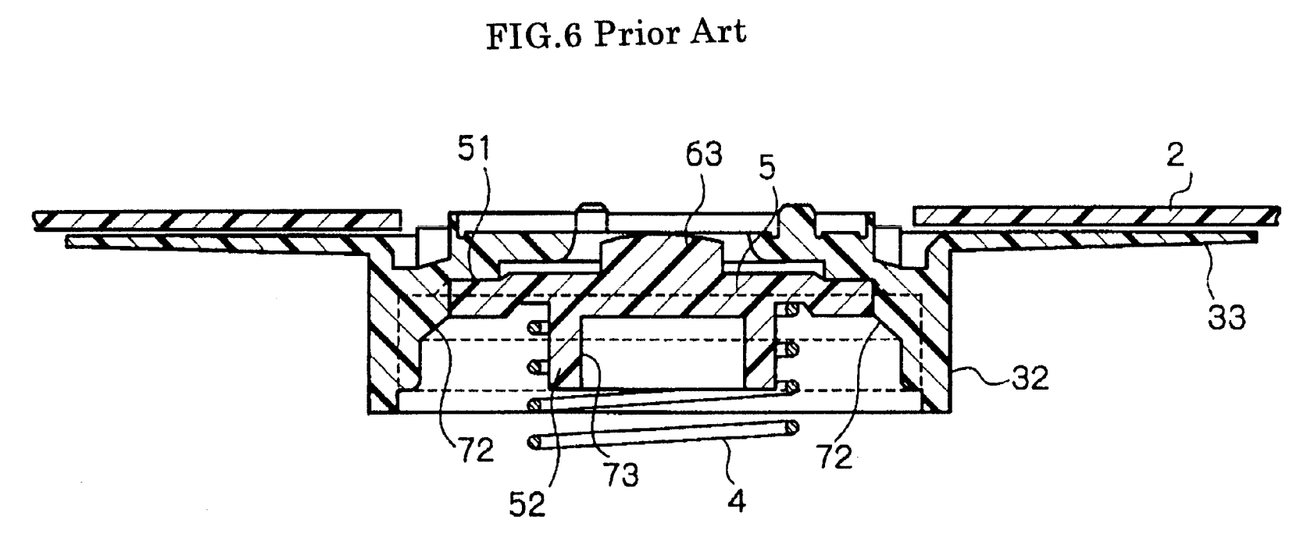
FIG. 6 is a fragmentary sectional view of the cartridge shown in FIG. 5.

FIG. 5 is an exploded view of a single-reel type cartridge of the prior art and FIG. 6 is a cross sectional view showing essential parts of the cartridge. For easier reference the components are shown upside down. The cartridge comprises a housing composed of an upper casing 1 and a lower casing 2, and a single tape reel 3 on which a length of tape 14 is wound and which is turnably held within the housing.

Upper and lower casings 1, 2 are formed, respectively, with cutouts 12, 22 which are joined to provide an opening into which a leader block 9 is inserted so as to be drawn out by a drive member on the part of a recorder.

Tape reel 3 consists integrally of a hub 32 formed in one piece with a lower flange 33. It is driven for rotation by a drive of a recorder that is inserted into the opening 20 of lower casing 2.

Hub 32 has a tooth-like part formed on its inner surface to be in mesh with a brake lock 5 so as to prevent unwanted turning of tape reel 3 when the latter is not in use.

Brake lock 5 has teeth 51 formed on its underside in mesh with the corresponding part of hub 32. Brake lock 5 is normally urged in the braking position by a brake spring 4.

A follower projection 52 of brake lock 5 has a recess 73 which slidably engages with a guide 13 formed on the inner surface of upper casing 1, allowing brake lock 5 to move up and down positively between a lower braking position and an upper brake release position.

A brake release projection 63 formed on the underside of brake lock 5 fits in a center hole 43 at the bottom of hub 32, and as soon as the cartridge is loaded in a recorder, brake release projection 63 is lifted with an attendant upward movement of brake lock 5 out of engagement with tape reel 3, setting the reel free to turn.

The beginning of tape 14 is wound round a pin member 8, which in turn is fixedly fitted in a pin-receiving groove of a leader block 18. When the cartridge is loaded in a recorder, leader block 18 is caught by a draw-out member that comes out of the recorder into an engaging recess 19 of the block. It is then drawn out, led along the tape path inside the recorder up to a takeup reel, and is eventually held within a recess formed in the periphery of the recorder's take-up reel.

In the cartridge of the prior art, the brake on the hub is released as brake lock 5 is lifted with its brake release projection 63 pressed by a brake release member of a recorder. When the center of either projection 63 or the brake release member of a recorder is off the center of the other (a situation that can result from dimensional errors of the products), smooth release of the brake is sometimes impossible because the brake lock fails to move straightly upward or because the outer periphery of brake lock 5 catches a sloped rib 72 (FIG. 6) that centers brake lock 5 with respect to hub 32.

It might seem possible then to accomplish positive release of the brake by the interposition of a brake release plate between the brake release member of a recorder and brake lock 5 on the part of the cartridge. However, the idea has not yet materialized in a perfect solution.

It is therefore an object of the present invention to provide a single-reel type tape cartridge capable of releasing the brake on the hub reliably and positively.

In the above case the brake release plate would turn in contact with the brake button while the tape reel is turning. If the two parts are not in good sliding contact, they would hamper smooth turning of the tape reel.

It is therefore another object of the invention to provide a single-reel type tape cartridge capable of ensuring smooth turning of the tape reel.

SUMMARY OF THE INVENTION

The present invention realizes the above objects by providing a tape cartridge wherein a single tape reel on which a length of tape is wound is turnably held within a housing consisting of an upper casing and a lower casing, the lower casing having an opening through which a drive shaft of a recorder is to be inserted, the tape reel having a hub which is open at top and is closed at the bottom with a wall, the bottom wall of the hub having holes for engagement with a brake release plate, a metal disk is attached to the outer surface of the underside of said hub and teeth are formed on the outer surface around the metal disk for engagement with the drive shaft of a recorder, teeth to engage a brake lock are formed on the inner bottom surface of the bottom wall of the hub, a brake release plate is mounted in the hub with legs fitted in the holes of the latter, a brake lock rests on the brake release plate, the brake lock having brake teeth formed on the periphery of the underside to be in mesh with the teeth of the hub and having a follower projection on the upper surface which is adapted to be guided by a guide projection formed in the upper casing so as to be movable upward and downward but not turnable, and a spring member is provided between the brake lock and upper casing to urge the brake lock in the braking position, characterized in that said brake lock is formed with a dent (or lug) with a spherical end in the center of its underside, and the brake release plate is formed with a corresponding lug (or dent) with a spherical end on its upper surface.

Here even more accurate reel centering is made possible by increasing the radius of curvature R of the dent to a value greater than the radius of curvature r of the end of the lug.

The invention also provides a tape cartridge wherein a single tape reel on which a length of tape is wound is turnably held within a housing consisting of an upper casing and a lower casing, the lower casing having an opening through which a drive shaft of a recorder is to be inserted, the tape reel having a hub which is open at top and is closed at the bottom with a wall, the inner bottom wall of the hub having holes for engagement with a brake release plate, a metal disk is attached to the outer surface of the underside of said hub and teeth are formed on the outer surface around the metal disk for engagement with the drive shaft of a recorder, teeth to engage a brake lock are formed on the inner bottom surface of the hub, a brake release plate is mounted in the hub with legs fitted in the holes of the latter, a brake lock rests on the brake release plate, the brake lock having brake teeth formed on the periphery of the underside to be in mesh with the teeth of the hub and having a follower projection on the upper surface which is adapted to be guided by a guide projection formed in the upper casing so as to be movable upward and downward but not turnable, and a spring member is provided between the brake lock and upper casing to urge the brake lock in the braking position, characterized in that a highly slippery sheet member is interposed between the contacting parts of the brake lock and the brake release plate.

Preferably, the brake lock is formed with a dent (or lug) with a spherical end in the center of its underside, and the brake release plate is formed with a corresponding lug (or dent) with a spherical end on its upper side.

Also preferably, reinforcing ribs are provided on the underside of the brake release plate.

According to the invention, a dent (or lug) with a concave or convex surface is formed in the center of a brake lock and a corresponding lug (or dent) with a convex or concave surface is formed on the upper surface of a brake release plate. Thus, even if the brake lock and brake release plate are out of center alignment upon release of the brake, the concave and convex of the two centers remain aligned, performing automatic centering of the tape reel and ensuring stable turning of the reel.

Also, under the invention, the friction between the contacting rake has been released is decreased by the interposition of a highly slippery sheet material, and the turning of the tape reel is made smooth.

BRIEF DESCRIPTION OF THE DRAWINGS

FIG. 2 gives sectional views of a cartridge illustrating its brake release mechanism, (a) when the brake is locked and (b) when the brake is released;

FIG. 3 gives sectional views of the first embodiment of cartridge, (a) when the brake is locked, (b) when the brake is released, and (c) a fragmentary enlarged view of (a);

FIG. 4 gives sectional views of a second embodiment of cartridge, (a) when the brake is locked, (b) when the brake is released, and (c) a fragmentary enlarged view of FIG. 3(a);

FIG. 8 shows in perspective a hub in the above embodiment, (a) as seen from above and (b) from below;

FIG. 9 shows in perspective a brake lock in the above embodiment, (a) as seen from below and (b) from above;

FIG. 10 shows in perspective a brake release plate, (a) as seen from above and (b) from below; and FIG. 11 gives sectional views of the tape cartridge of the above embodiment, (a) when the cartridge is not in use (with the brake applied), (b) when the cartridge is in use (with the brake released), and (c) essential parts on an enlarged scale.

PREFERRED EMBODIMENTS OF THE INVENTION

The invention will now be described more concretely. The cartridge according to the invention comprises a housing and a single tape reel on which a length of tape is wound and which is turnably contained in the housing, a lower half casing of the housing having an opening through which a drive shaft of a recorder is inserted into the housing.

The tape reel consists of an upper flange, a lower flange, and a hub which is open at top and is closed at bottom with a bottom wall. The bottom wall of the hub is formed with engaging holes into which a brake release plate partly passes.

A magnetic metal disk is fixed to the underside of the bottom wall of the hub, and the underside has teeth to engage a drive shaft of a recorder. The inner bottom surface of the bottom wall of the hub is formed with teeth to engage a brake lock.

Inside the hub is mounted the brake release plate having legs adapted to fit in the engaging holes in such a manner not to interfere with the teeth of the hub and the teeth of the brake lock.

The brake lock rests on the brake release plate. On the periphery of its underside are formed brake teeth adapted to mesh with the teeth of the hub, and a follower projection is formed on the upper surface. While the tape cartridge is not in use, the hub teeth and the brake teeth of the brake lock are in mesh to hold the tape reel against turning.

The follower projection of the brake lock is formed with a groove to engage a guide projection formed in the upper casing to move freely upward and downward together. The brake lock is not turnable because the guide projection of the upper casing and the groove of the brake lock are both irregularly shaped.

Between the brake lock and the upper casing is disposed a spring member that urges the brake lock in the braking position.

In the center of the underside of the brake lock is formed a lug (or dent) with a spherical end (having a radius of curvature R), and on the upper surface of the brake release plate is formed a corresponding dent (or lug) with a spherical end (having a radius of curvature r), preferably R being greater than r.

Figure 1:
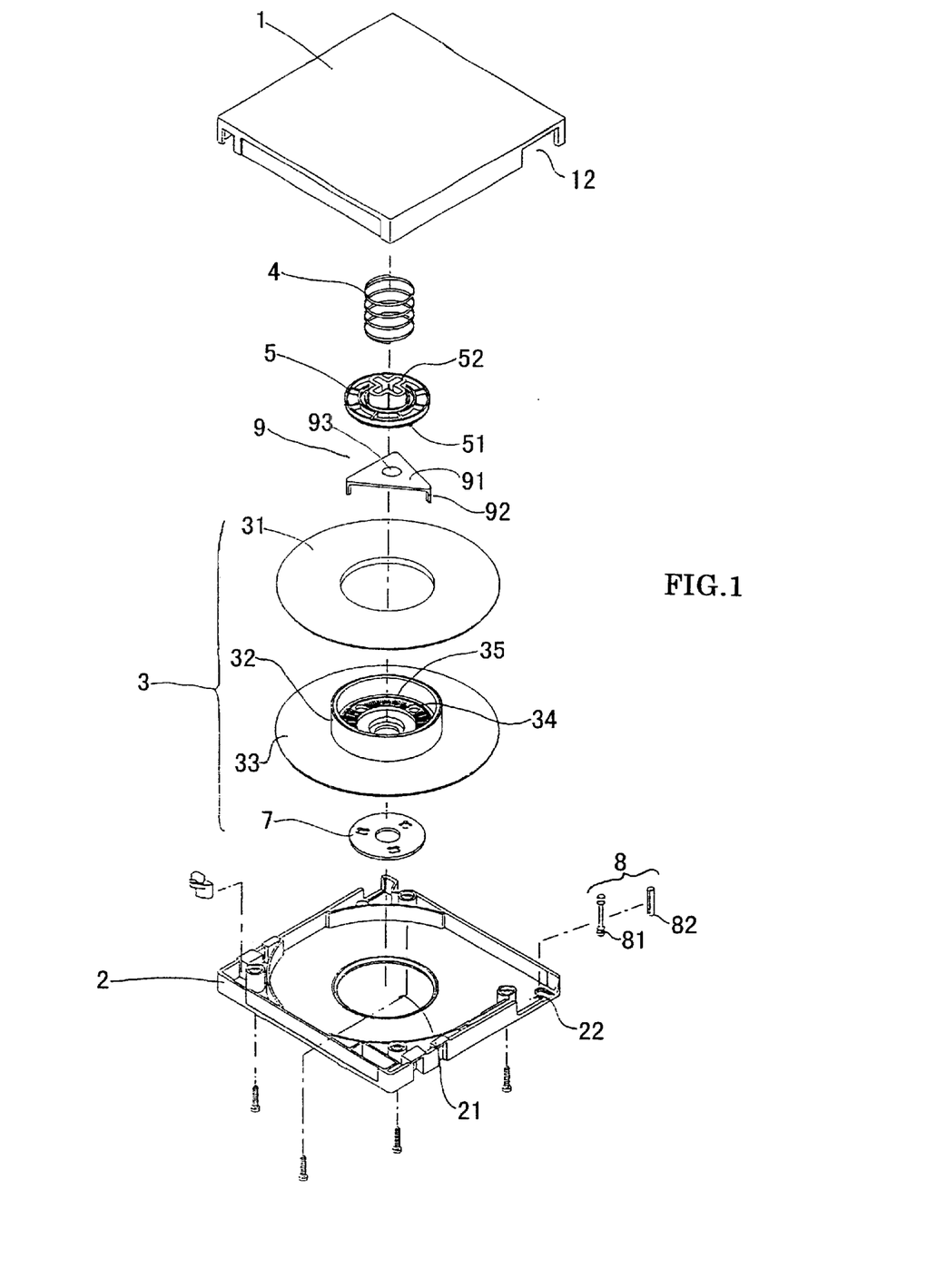
FIG. 1 is an exploded view of a tape cartridge as a first embodiment of the present invention.

FIG. 1 is an exploded view of a cartridge embodying the present invention.

The cartridge comprises a housing composed of upper and lower casings 1, 2 and a single tape reel 3 on which a length of tape 14 is wound and which is turnably held within the housing.

Lower casing 2 has a hole 21 to receive a drive shaft of a recorder. Upper and lower casings 1, 2 are formed, respectively, with cutouts 12, 22 which are joined to provide an opening through which tape is to be pulled out.

Tape reel 3 consists integrally of an upper flange 31, a hub 32 formed in one piece with a lower flange 33, and a metal disk 7 of a magnetic material that fits to the underside of hub 32. Metal disk 7 has teeth (not shown) formed on the underside along its periphery and adapted to engage with a drive shaft of a recorder, whereby the disk is magnetically attracted to turn tape reel 3. There is no member to fix the tape in place, because the tape is directly affixed to the outer periphery of the hub with water or the like.

Hub 32 has a tooth-like part 35 formed on its inner surface to be in mesh with a brake lock 5 to prevent unwanted turning of tape reel 3 when the latter is not in use.

Brake lock 5 has a tooth-like part 51 formed on its underside in mesh with the corresponding part 35 of hub 32. Brake lock 5 is normally urged in the braking position by brake spring 4. Brake lock 5 can be positively moved up and down between the braking position and a brake release position as its upward projection 52 has a recess adapted to engage a positioning projection (indicated at 13 in FIG. 2) formed on the inner surface of upper casing 1. The recess is cruciform in horizontal cross section and is engaged with the positioning projection of a similar contour, preventing the two components from turning in any direction.

A brake release plate 9 is interposed between hub 32 and brake lock 5. Brake release plate 9 consists of a main plate 91 and legs 92. Legs 92 fit in small holes 34 in the under surface of hub 32. Once the cartridge is loaded in a recorder, a brake release member of the recorder lifts the legs 92 of brake release plate 9 and hence the brake release plate itself while metal disk 7 is magnetically attracted by a shaft of the recorder, with a consequent lift of brake lock 5 out of engagement with tape reel 3, setting the reel free to turn.

The leader end of tape is fixed to a leader 8, which consists of a pin member 81 and a C-shaped clamp 82. Tape 6 is partly wound round pin member 81 and is secured in place as C-shaped clamp 82 is fitted over that member. When the cartridge is inserted into a recorder, leader 8 is held in position by a holder of the recorder so that tape 6 can be pulled out.

Figure 2A:
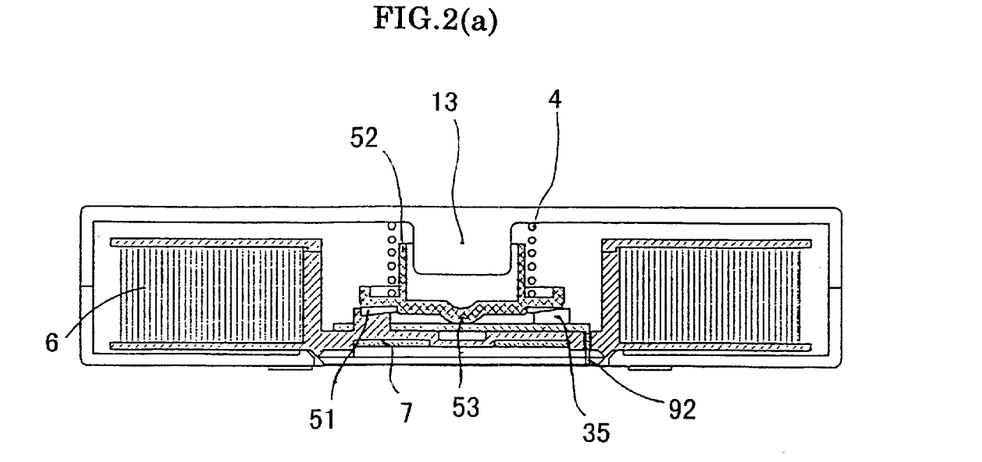
Figure 2B:
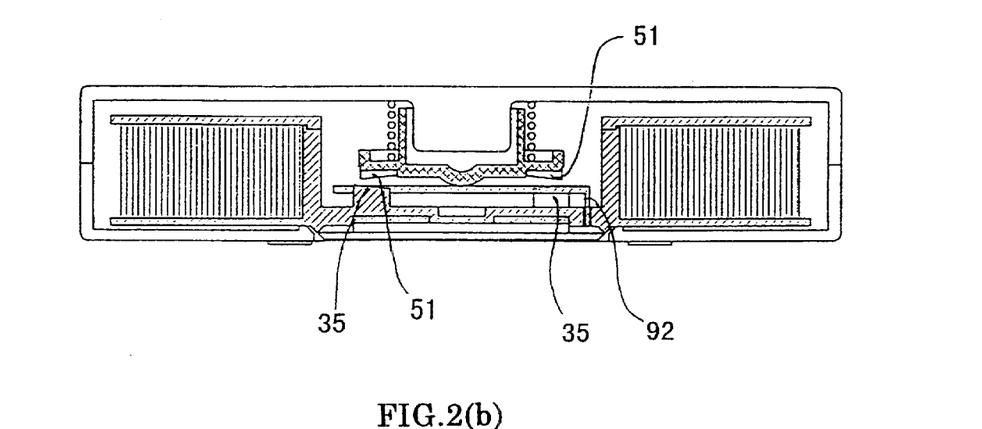

FIG. 2 illustrates a cartridge in cross sections to show, by way of reference, a brake release mechanism before incorporating the structure according to the invention, (a) when the cartridge is not in use and (b) when it is loaded in a recorder.

To prevent unwanted rotation of tape reel 3, teeth 35 formed on the inner surface of hub 32 are engaged with teeth 51 of brake lock. A follower projection 52 of brake lock 5 fits on a projection 13 formed in upper casing 1 to hold brake lock 5 from turning.

Between hub 32 and brake lock 5 is disposed a brake release plate 9, which is in contact with a center lug 53 of brake lock 5 and is thereby urged downward.

Brake release plate 9 has a plurality of (e.g., three) equidistantly spaced legs 92 fitted in small holes 34 correspondingly formed in hub 32. The ends of legs 92 extend beyond hub 32 but not beyond the outer surface of lower casing 2.

When the cartridge is loaded in a recorder, tape reel 3 (with the aid of magnetic metal disk 7) is sucked up by a drive shaft of the recorder from the state shown in FIG. 2(a). At the same time, the drive shaft pushes legs 92 upwardly with a concomitant lift of brake lock 5, disengaging its teeth 51 from teeth 35 of hub 32 and setting tape reel 3 free to turn. Legs 92 of brake release plate 9 remain fitted in holes 34 of hub 32, and the brake release plate turns together with tape reel 3 (as in FIG. 2(b)).

Center lug 53 of brake lock 5 and brake release plate 9 are simply in contact, and looseness of engagement between the upper casing and brake lock or between brake lock and hub can sometimes bring the center of brake lock 5 out of alignment with that of brake release plate 9. In that case brake lock 5 upon its release might fail to press the center of tape reel 3 exactly enough to turn it stably.

First embodiment

Figure 3A:
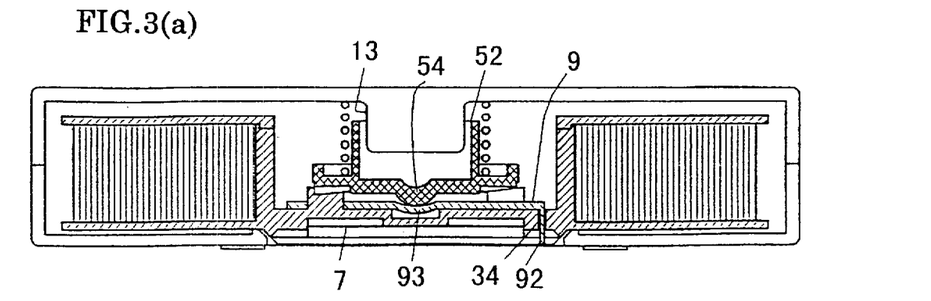
Figure 3B:
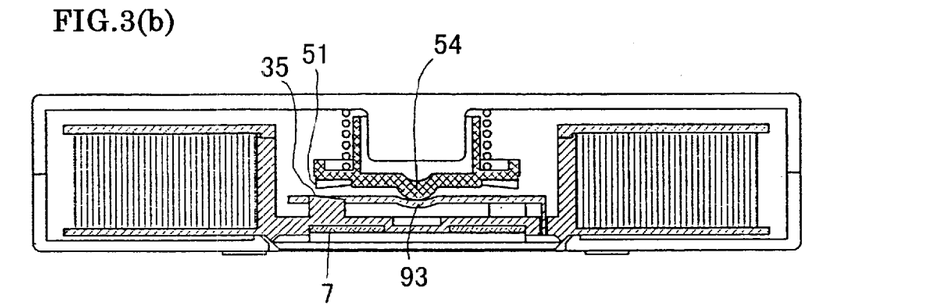
Figure 3C:
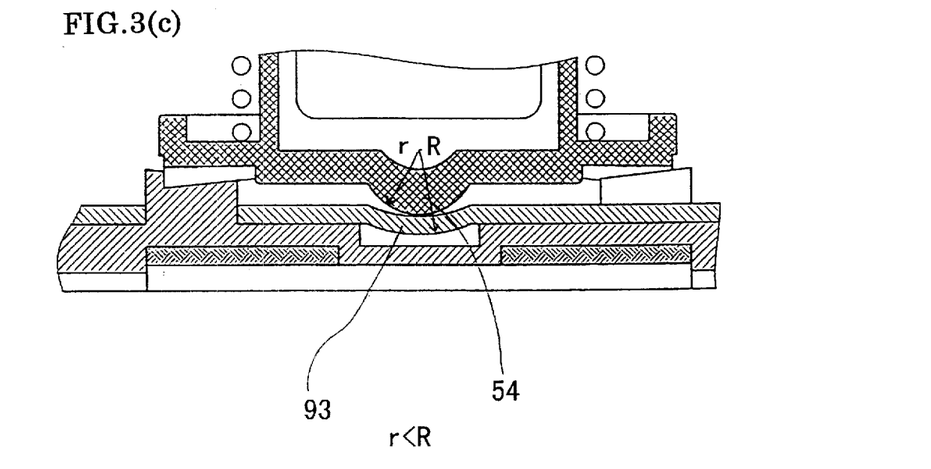

Under the invention, as shown in FIG. 3, a lug 54 is formed in the center of brake lock 5 and a dent 93 in the center of the main plate 91 of brake release plate 9. Thus, even if brake lock 5 and brake release plate 9 are out of center alignment upon release of the brake, the concave and convex of the two centers remain aligned, ensuring stable turning of the tape reel. The alignment is made more certain by forming a dent 93 with a radius of curvature R greater than the radius r of the convex surface of lug 53.

Second embodiment

Figure 4A:
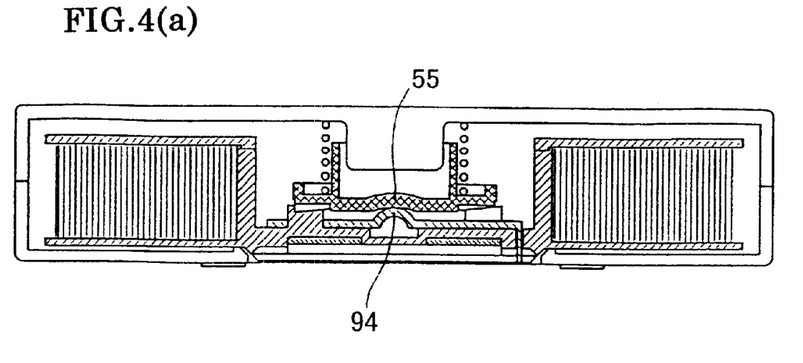
Figure 4B:
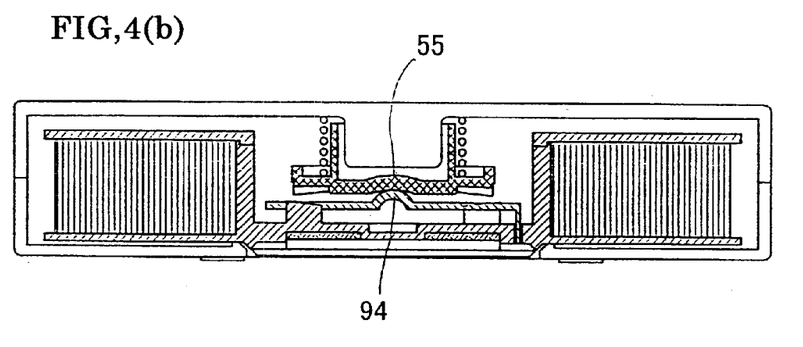
Figure 4C:
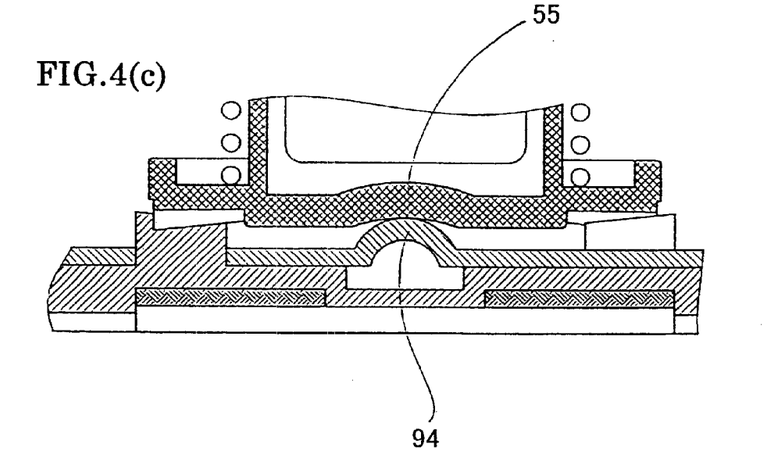

FIG. 4 illustrates reversal of the concavo-convex relationship. Lug 54 of the first embodiment is replaced by a dent 55 and dent 93 replaced by a lug 94, and a similar favorable effect is achieved. Dent 55 with a radius of curvature R greater than the radius 5 of the head of lug 94 enhances the alignment.

Even when the center of either brake release plate or brake lock is off the center of the other, the two centers can be aligned and stable tape running is ensured.

Figure 7:
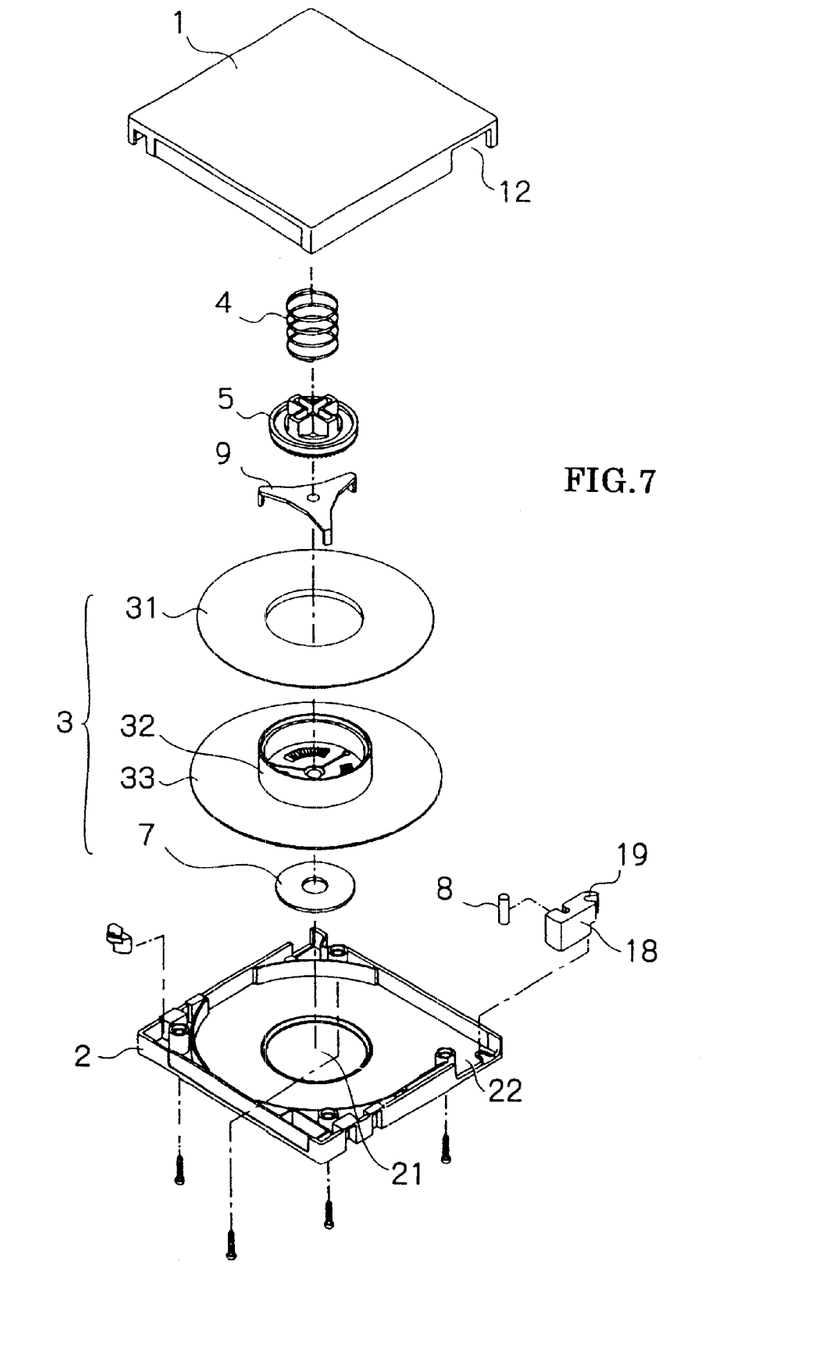
FIG. 7 is an exploded view of another embodiment of the cartridge of the invention.

FIG. 7 is an exploded view of a tape cartridge as another embodiment of the invention.

The cartridge comprises a housing consisting of upper and lower casings 1, 2 and a single tape reel 3 on which a length of tape is wound and which is turnably contained in the housing.

Lower casing 2 has an opening 21 through which a drive shaft of a recorder is inserted into the housing. Upper and lower casings 1, 2 have cutouts 12, 22, respectively, which are joined to form an opening through which tape is to be pulled out.

Tape reel 3 consists of an upper flange 31, a hub 32 formed in one piece with a lower flange 33, and a metal disk 7 that fits integrally to the underside of hub 32. Metal disk 7 has drive teeth 39 (FIG. 8(b)) formed along its periphery and adapted to engage a drive shaft of a recorder, whereby the disk is magnetically attracted to turn tape reel 3. There is no member to fix the tape in place, because the tape is directly affixed to the outer periphery of the hub with water or the like.

Hub 32 has teeth 35 formed on its inner surface to be in mesh with a brake lock 5 to prevent unwanted turning of tape reel 3 when the latter is not in use.

As shown in FIG. 9, brake lock 5 has teeth 51 formed on its underside in mesh with the teeth 35 of hub 32. Brake lock 5 is normally urged in the braking position by brake spring 4. Brake lock 5 is not turnable but can be positively moved up and down between the braking position and brake release position as its follower projection 52 with a recess of an irregular shape slides in engagement with a positioning projection (indicated at 13 in FIG. 11) formed on the inner surface of upper casing 1.

A brake release plate 9 is interposed between hub 32 and brake lock 5. Brake release plate 9 consists of a main plate 91 and a plurality of legs 92. Legs 92 fit in small throughholes 36 formed in the under surface of hub 32. Once the cartridge is loaded in a recorder, a brake release member of the recorder lifts the legs 92 of brake release plate 9 and hence the brake release plate itself while metal disk 7 is magnetically attracted by a shaft of the recorder, with a consequent lift of brake lock 5 out of engagement with tape reel 3, setting the reel free to turn.

Figure 8A:
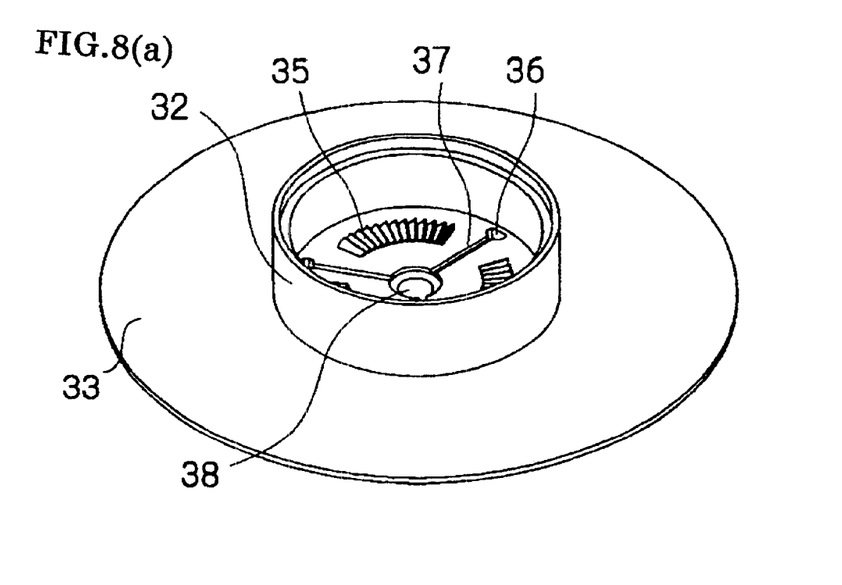
Figure 8B:
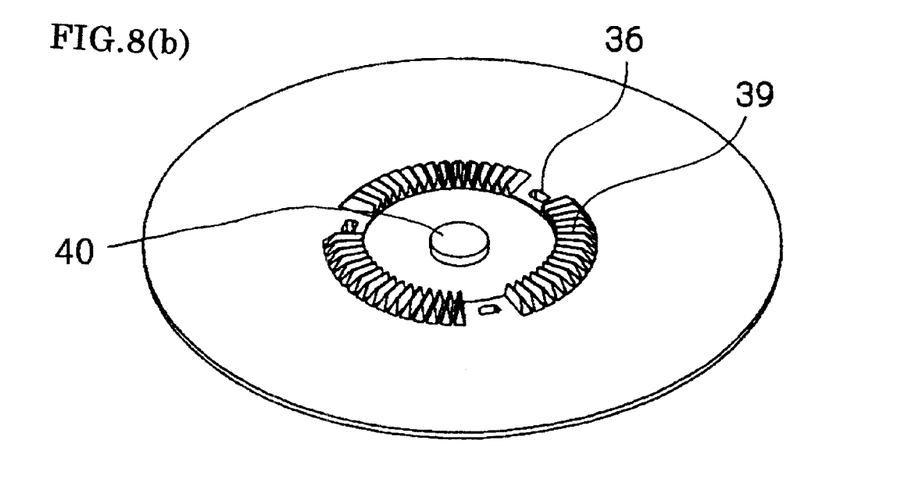

FIG. 8 shows hub 32 in perspective. The lower surface of hub 32 has teeth 35 formed in portions away from throughholes 36, to be in mesh with brake lock 5. In the center of the hub is formed a dent 38, which is connected with the throughholes with radial grooves 37.

On the outer side of the lower surface of hub 32 is formed drive teeth 39 adapted to engage a corresponding part of a recorder, and in the center is formed a projection 40 to fit in a center hole 71 of metal disk 7.

The beginning of tape 14 is partly wound round a pin member 81, which in turn is fitted securely in a pin-receiving groove of a leader block 18. When the cartridge is inserted into a recorder, leader block 18 is gripped at its engaging recess 19 by a draw-out member of the recorder. It is thus pulled out, led along a tape path to a take-up reel inside the recorder and is eventually held in a recess formed on the outer periphery of the take-up reel.

Figure 9A:
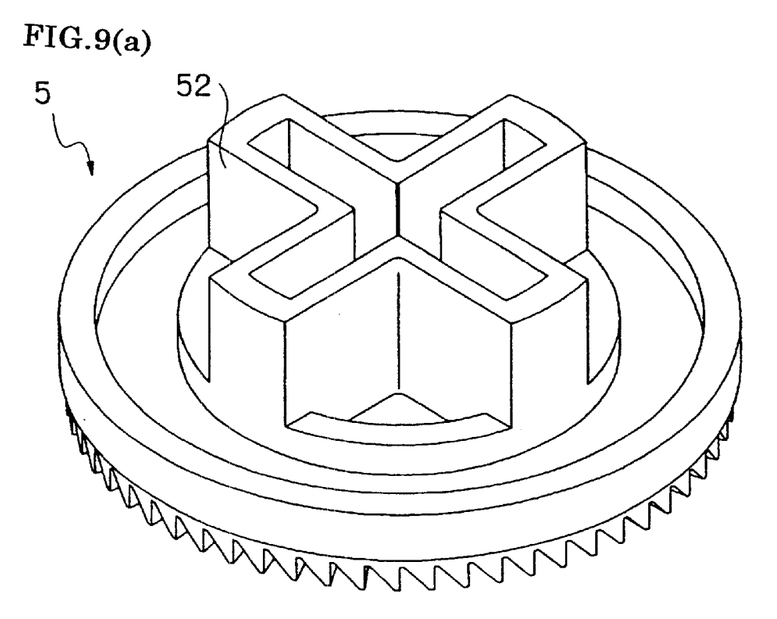
Figure 9B:
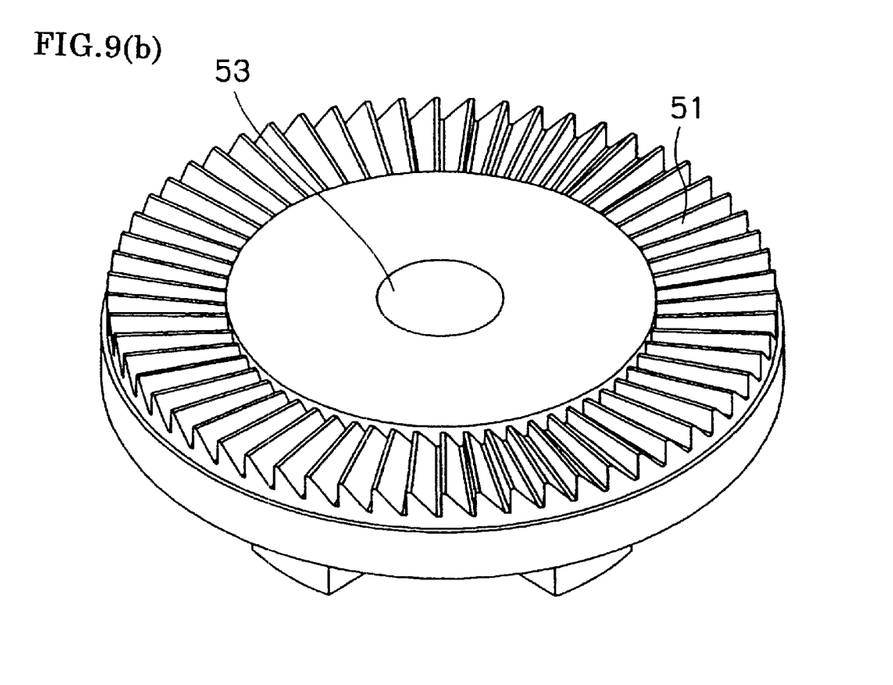

FIG. 9 illustrates brake lock 5 in perspective, (a) as seen from above and (b) from below. Brake lock 5 has brake teeth 51 formed on the underside and adapted to engage teeth 35 of hub 32 so as to prevent unwanted turning of tape reel 3 and also has a lug 53 formed in the center which comes in contact with a brake release plate 9.

Figure 10A:
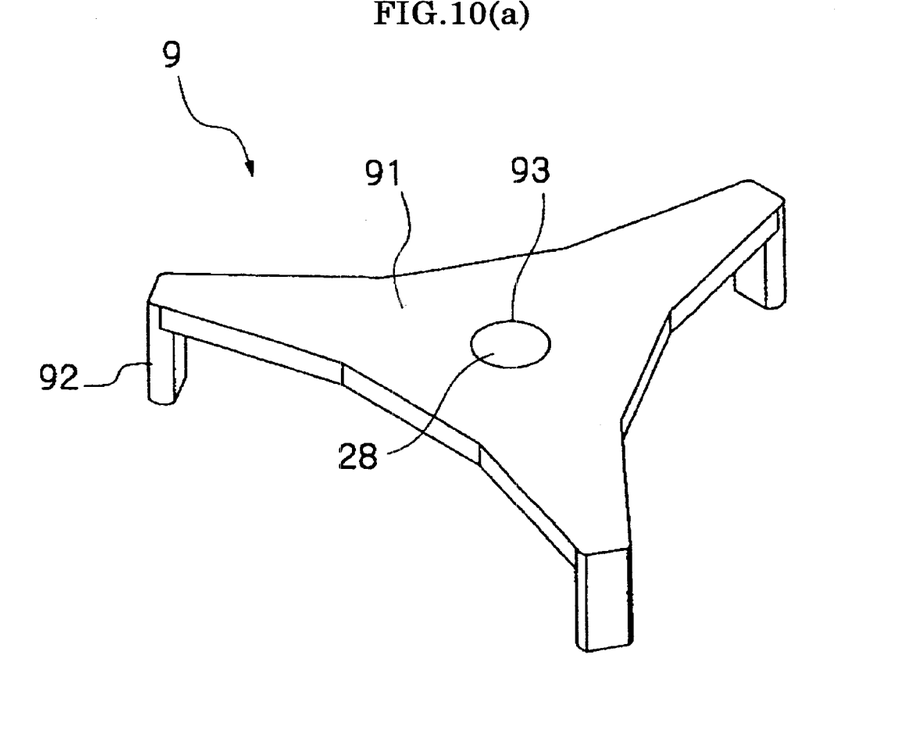
Figure 10B:
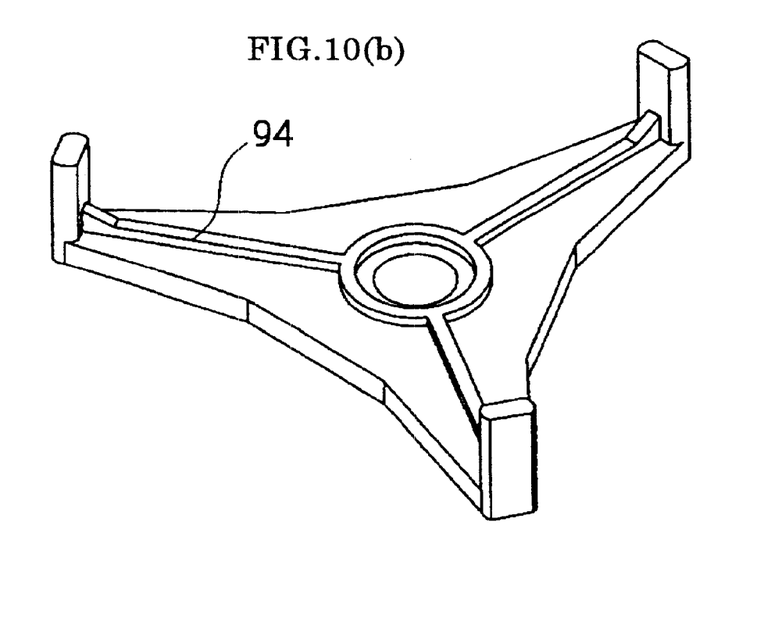

FIG. 10 shows brake release plate 9 in perspective, (a) as seen from above and (b) from below. Brake release plate 9 consists of three legs 92 and a generally triangular main plate 91. A dent 93 is formed in the center of main plate 91. Dent 93 is located where it comes in contact with lug 53 of brake lock 5, and its concavity helps prevent off-center alignment of the two parts and ensure smooth turning of the reel. A sheet member 28 of highly slippery material is affixed to dent 93. On the underside of brake release plate 9 there are formed first reinforcing ribs 94 between its center and legs 92. The reinforcing ribs improve the dimensional accuracy of the brake release plate and permit positive brake release. Legs 92 extend into throughholes 36 and beyond the underside of hub 32. Reinforcing ribs 94 fit in grooves 37 of hub 32.

Figure 11A:
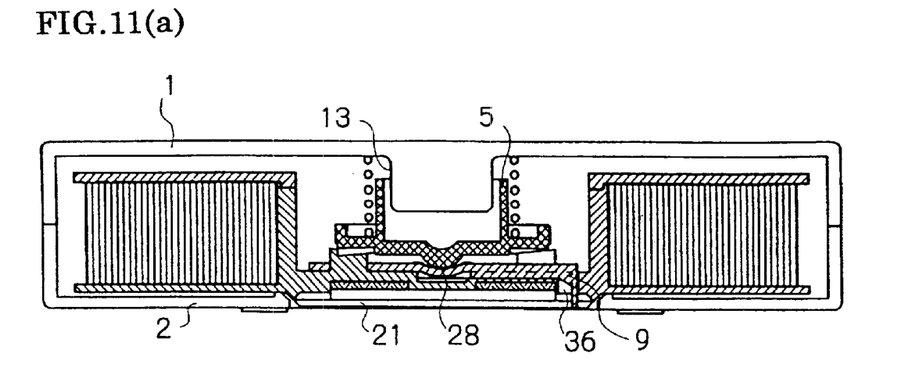
Figure 11B:
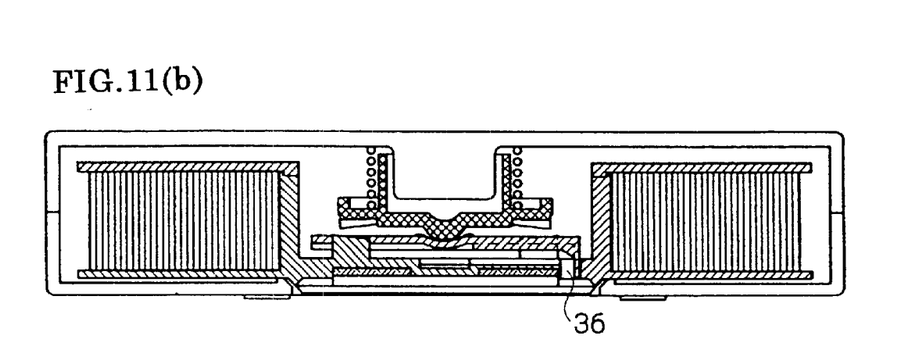
Figure 11C:
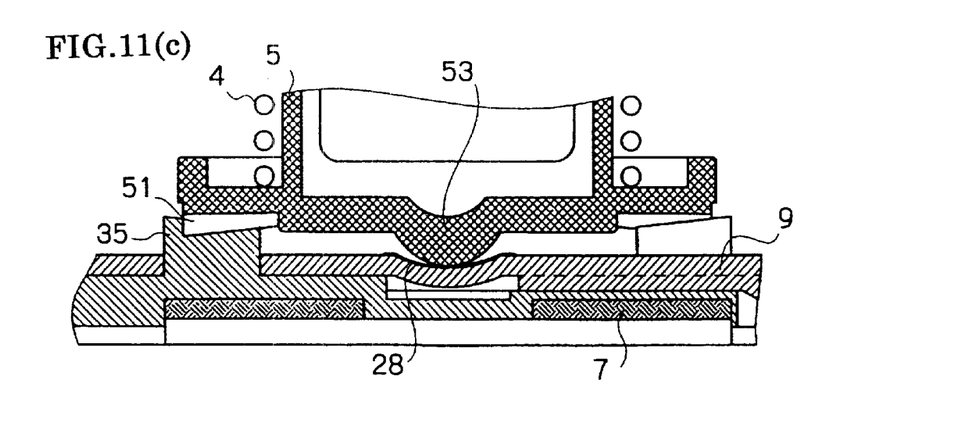

FIG. 11 gives sectional views of the cartridge. As indicated in FIG. 11(a), brake release plate 9 is constantly urged downward from above by brake lock 5. When the cartridge is used, legs 92 are forced upward as in FIG. 11(b), against the downward urging, by a brake release member (not shown) of a recorder, with consequent upward movement of brake release plate 9 and application of reversely directed forces to the center and legs 92 on the outer edges of brake release plate 9. For this reason first reinforcing ribs 94 are provided to add strength to brake release plate 9 as in FIG. 10(b).

Turning of tape reel 3, accompanied with the turning of brake release plate 9, brings brake lock 5 and brake release plate 9 into frictional contact. However, highly slippery sheet member 28 interposed between the two parts produces good sliding contact between them, ensuring stable tape reel turning.

Suitable material for slippery sheet member 28 is Teflon sheet or ultra-high-molecular-weight polyethylene sheet. Sheet member 28 is affixed to brake release plate 9 with adhesive.

Although sheet member 28 is affixed to brake release plate 9 in the illustrated embodiment, the sheet may be affixed to lug 53 of brake lock 5 instead. It is further possible to reverse the concavo-convex relationship of lug 53 of brake lock 5 and dent 93 of brake release plate 9.

The interposition of a highly slippery sheet member according to the invention improves the sliding contact between the brake lock and brake release plate and permits the tape reel to turn stably.

Also, because the brake lock and brake release plate are in contact through their lug and dent, the center of rotation can be properly maintained and more smooth turning of the tape reel is ensured.

What is claimed is:

1. A tape cartridge wherein a single tape reel on which a length of tape is wound is turnably held within a housing comprising an upper casing and a lower casing, the lower casing having an opening through which a drive shaft of a recorder is to be inserted, said tape reel having a hub which is open at top and is closed at the bottom with a wall, the inner bottom wall of said hub having holes for engagement with a brake release plate, a metal disk is attached to the outer surface of the underside of said hub and teeth are formed on the outer surface around the metal disk for engagement with the drive shaft of a recorder, teeth to engage a brake lock are formed on the inner bottom surface of the bottom wall of said hub, a brake release plate is mounted in said hub with legs fitted in the holes of the latter, a brake lock rests on said brake release plate, said brake lock having brake teeth formed on the periphery of the underside to be in mesh with the teeth of said hub and having a follower projection on the upper surface which is adapted to be guided by a guide projection formed in the upper casing so as to be movable upward and downward but not turnable, and a spring member is provided between said brake lock and upper casing to urge said brake lock in the braking position, characterized in that said brake lock is formed with a dent or lug with a spherical end in the center of the underside thereof, and said brake release plate is formed with a corresponding lug or dent with a spherical end on the upper surface thereof.

2. The tape cartridge according to claim 1, characterized in that the radius of curvature R of said dent is greater than the radius of curvature r of said lug.

3. A tape cartridge wherein a single tape reel on which a length of tape is wound is turnably held within a housing comprising an upper casing and a lower casing, the lower casing having an opening through which a drive shaft of a recorder is to be inserted, said tape reel having a hub which is open at top and is closed at the bottom with a wall, the inner bottom wall of said hub having holes for engagement with a brake release plate, a metal disk is attached to the outer surface of the underside of said hub and teeth are formed on the outer surface around the metal disk for engagement with the drive shaft of a recorder, teeth to engage a brake lock are formed on the inner bottom surface of the bottom wall of said hub, a brake release plate is mounted in said hub with legs fitted in the holes of the latter, a brake lock rests on said brake release plate, said brake lock having brake teeth formed on the periphery of the underside to be in mesh with the teeth of said hub and having a follower projection on the upper surface which is adapted to be guided by a guide projection formed in the upper casing so as to be movable upward and downward but not turnable, and a spring member is provided between said brake lock and upper casing to urge said brake lock in the braking position, characterized in that a highly slippery sheet member is interposed between the contacting parts of said brake lock and said brake release plate.

* * * * *